United States Patent [19]

Rabinow

[11] 4,158,944

[45] Jun. 26, 1979

[54] ROTARY BLADE COUPLING FOR LAWN MOWER

[75] Inventor: Jacob Rabinow, Bethesda, Md.

[73] Assignee: Hall & Myers, Potomac, Md.; a part interest

[21] Appl. No.: 834,931

[22] Filed: Sep. 20, 1977

[51] Int. Cl.² ............... A01D 75/20; 64 30 R;30 C
[52] U.S. Cl. ......................... 56/11.3; 56/10.3; 56/11.8; 192/17 R; 192/28
[58] Field of Search ............ 56/11.3, 11.6, 11.7, 56/11.8, 10.3; 192/28, 17 R; 64/30 R, 30 C

[56] References Cited

U.S. PATENT DOCUMENTS

| | | | |
|---|---|---|---|
| 1,043,932 | 11/1912 | Herrick | 192/28 |
| 2,201,715 | 5/1940 | Burnett | 192/28 |
| 2,746,584 | 5/1956 | Skromme | 192/28 |
| 3,493,088 | 2/1970 | Hoff | 56/11.8 |
| 4,044,533 | 8/1977 | Wick | 56/11.3 |
| 4,048,788 | 9/1977 | Kamlukin et al. | 56/11.3 |
| 4,055,935 | 11/1977 | Malion et al. | 56/11.3 |

Primary Examiner—Jay N. Eskovitz
Attorney, Agent, or Firm—Hall & Myers

[57] ABSTRACT

This invention relates to a coupling device and especially a coupling device operable by a dead-man's handle on a lawnmower. When used in a lawnmower the coupling device couples the motor shaft to the cutting blade. A spool has a hole in it that surrounds the shaft. A rotary connecting device normally couples the spool to the shaft so that the spool and shaft rotate together. A disconnect element and brake are operated when the dead-man's handle is released to disconnect the spool from the shaft and subsequently stop the spool. The cutting blade has a central hole through which the spool passes. The blade is in frictional contact with the flanges of the spool and is rotated thereby.

14 Claims, 9 Drawing Figures

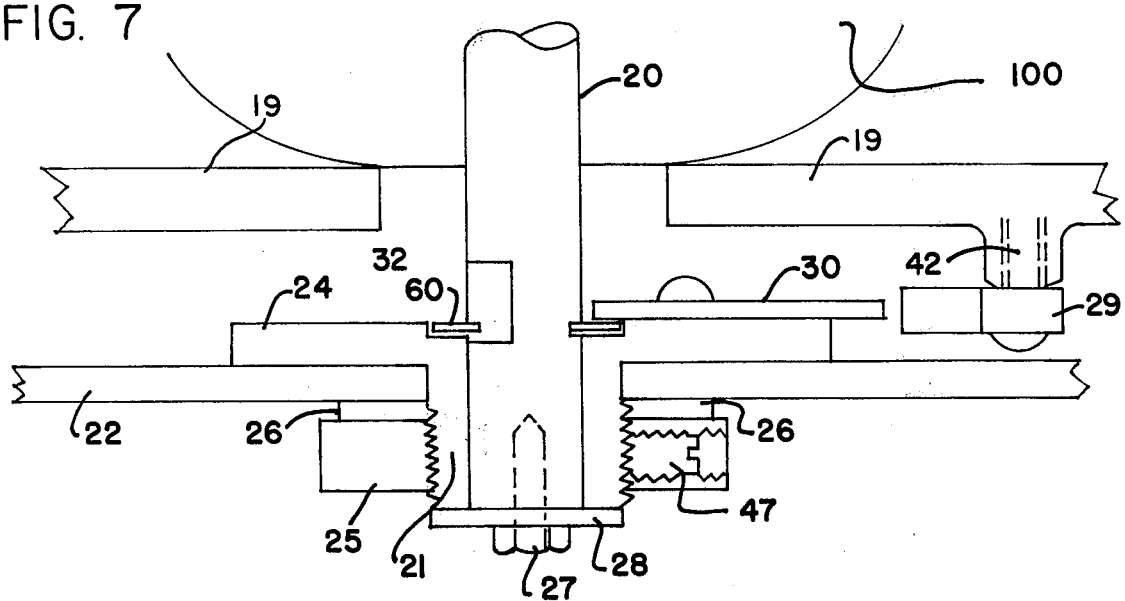
FIG. 7
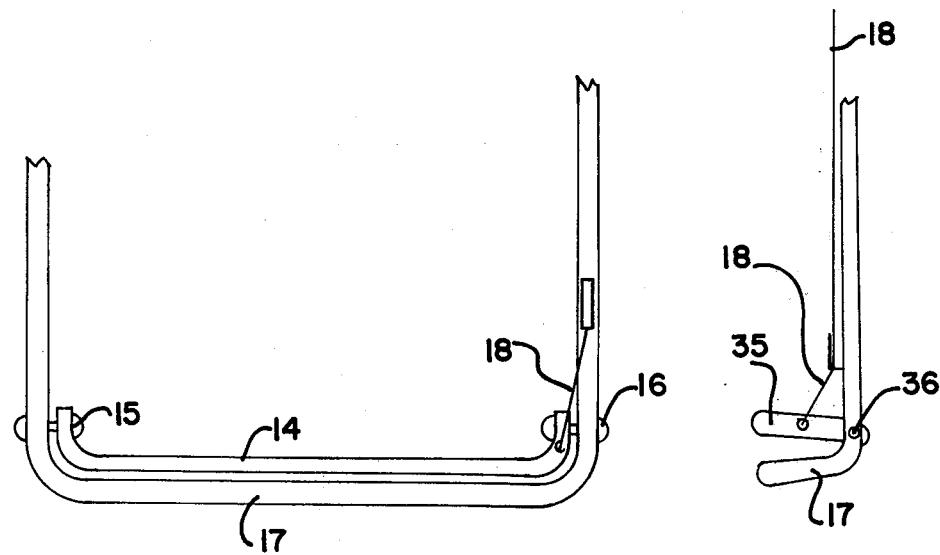
FIG. 8
FIG. 9

4,158,944

ROTARY BLADE COUPLING FOR LAWN MOWER

SUMMARY OF THE INVENTION

The essence of my clutch is this: In many lawn mowers, the blade is coupled to the engine shaft through a friction device so that in case the blade hits an object, such as a tree stump or a large rock, the friction coupling permits slippage between the blade and the shaft and prevents damage to the engine. In some machines, a shear pin or a soft coupling-washer is employed for the same purpose. In case the shear pin or washer is damaged, the device is taken apart and the pin or washer is replaced.

I make use of the friction coupling to permit the rapid stopping and starting of the blade without changing its function as an overload safety device. Instead of mounting the blade directly on the shaft, I mount the blade on a small spool which, in turn, is mounted on the shaft of the engine. A permanently-set friction coupling is arranged between the blade and the spool and this friction coupling is not changed during the various operations of the machine. The spool, however, can be coupled and uncoupled from the shaft by a simple dog clutch which, in turn, can be acted upon by a dead man's handle.

During normal operations, the dog clutch couples the spool to the shaft and the friction between the spool and the blade drives the blade so as to cut the grass. When the dead man's handle is released, an interposer is dropped into the path of the dog clutch mounted on the spool. This produces two effects. The dog clutch disconnects the spool from the engine shaft and the interposer acts to stop the rotation of the spool very rapidly. Because the inertia of the spool is very small, the stopping action can essentially be an impact and the energy of the spool is absorbed in the elasticity and losses of the interposer and of the spool material itself. Because of this, the spool inertia should be kept as small as possible and some elasticity can be built into the interposer or its mounting so as to minimize the shock on these two members.

The interposer should go into its operation very rapidly so as to fully engage the dog clutch and the spool during the interval of a single revolution of the machine. Since the dead man's handle may be released slowly, a toggle mechanism (or some other rapid-release device) should be used at the interposer so that its action should be independent of the speed of release of the dead man's handle.

When the spool is stopped, the blade continues to rotate for a very short time and is brought to rest by the friction between it and the spool. This friction should be set at a value slightly higher than the maximum torque that can be produced by the engine. A lower value would permit the blade to slip during the normal cutting of the grass or weeds and would cause rapid wear if the surfaces, while much higher value (while not too objectionable) would simply put a larger load on the spool-stopping and starting mechanisms. The larger friction values, however, would cause the blade to stop more quickly.

When the dead man's handle is again engaged (that is, the mower operation is started again), the interposer is moved out of the way, the dog clutch engages the shaft of the engine, and the spool is started on its rotation very rapidly. The friction coupling between the spool and the blade starts the blade rotating and again the shock on the system is absorbed by the friction coupling so that the blade comes up to speed more slowly than the spool. Since the friction is set for a torque value which the engine can easily withstand, no damage will occur to the engine.

FIG. 7 is a cross-section of the engine, engine shaft, first and second clutches, the blades, and associated apparatus.

FIG. 8 is a top view of the lawn mower's handle showing further details of the dead man's handle.

FIG. 9 is a top view of modified form of dead man's handle.

DETAILED DESCRIPTION OF THE INVENTION

Figure 1:
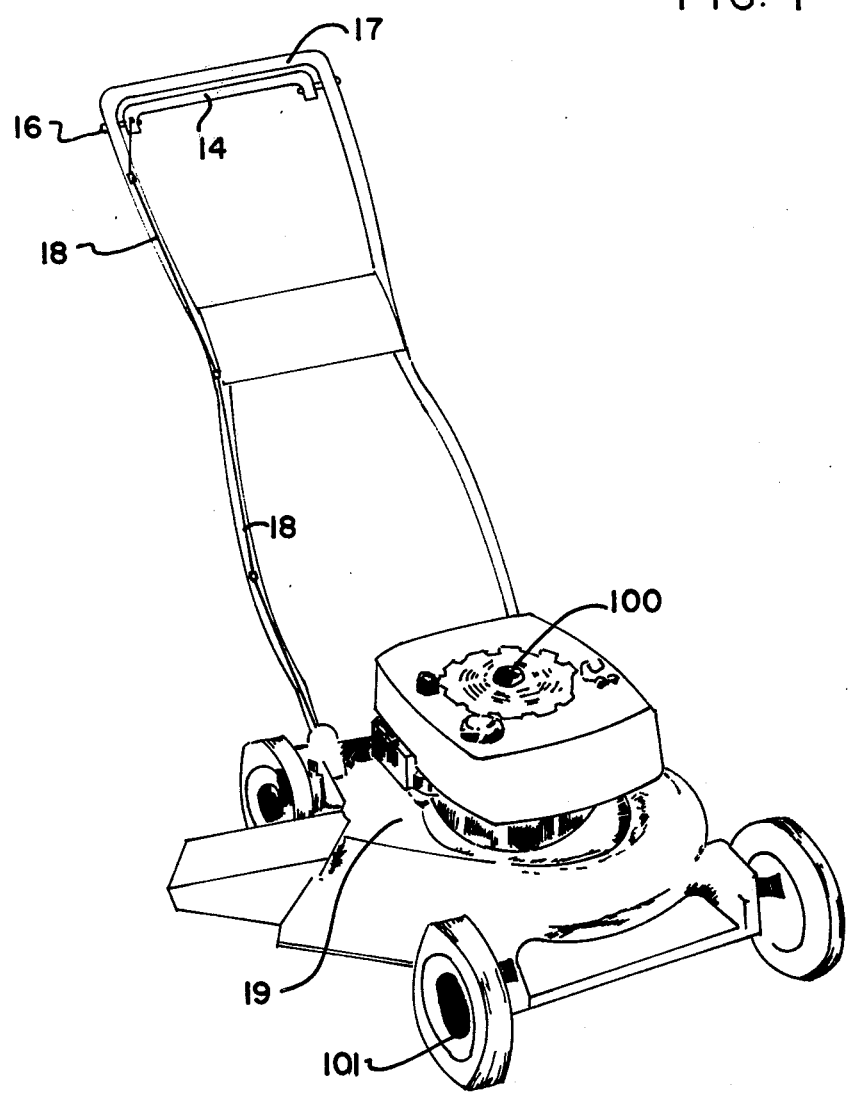
FIG. 1 is a perspective view of a lawn mower embodying my invention.
Figure 3:
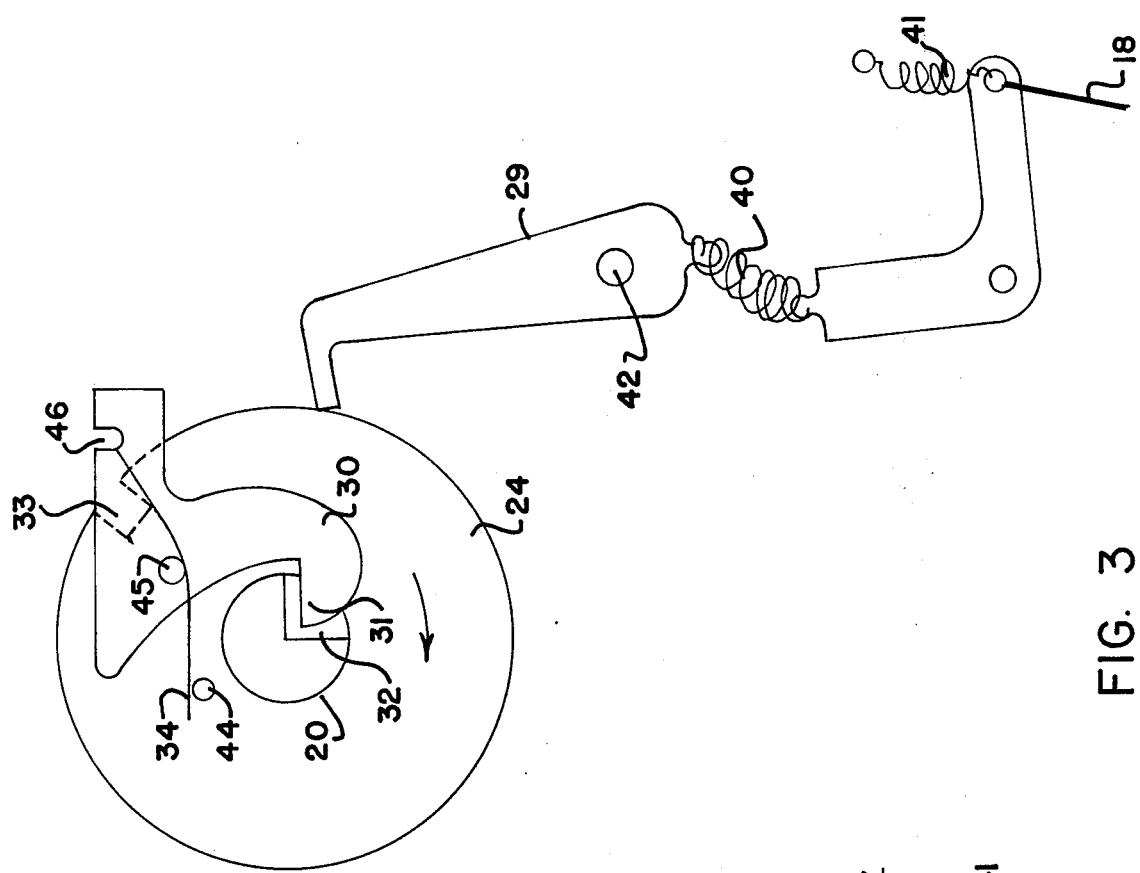
FIG. 3 is a view similar to that of FIG. 2 except immediately after release of the dead man's handle.

In FIG. 1 the lawn mower has an engine 100 mounted on frame 19 which is carried by the conventional wheels 101. The mower is pushed and pulled by a handle having a cross-arm 17. A dead man's handle 14 is biased in any suitable conventional manner into an "off" position. It is mounted for sliding movement by pins 16. When the operator grips both the cross-arm 17 and the dead man's handle 14 he moves the dead man's handle 14 toward the cross-arm 17 and operates Bowden cable 18 to turn the blades 22 of the lawn mower "on". If the operator, for any reason, ceases to grip both the cross-arm 17 and the dead man's handle 14 the bias on handle 14 will move it away from cross-arm 17 and stop the blades 22.

The engine 100 of the lawn mower is secured to and carried by frame 19.

The lawn mower is of the vertical shaft type which is very common today in rotary lawn mowers. Shaft 20 descending from the engine 100 has mounted upon it a spool 21 which carries the cutting blade 22. The spool 21 is held on the shaft 20 by "C" washer 60, washer 28, and bolt 27. The blade 22 is held by friction in the spool, with the friction being provided by the upper plate 24, a spring washer 26, and a nut 25. The friction controlling nut 25 is adjusted at the factory, or the friction is set by means of the spring washer 26 to be equal to the maximum torque that can be provided by the driving engine 100. This friction is not changed during the operation of the machine.

Figure 2:
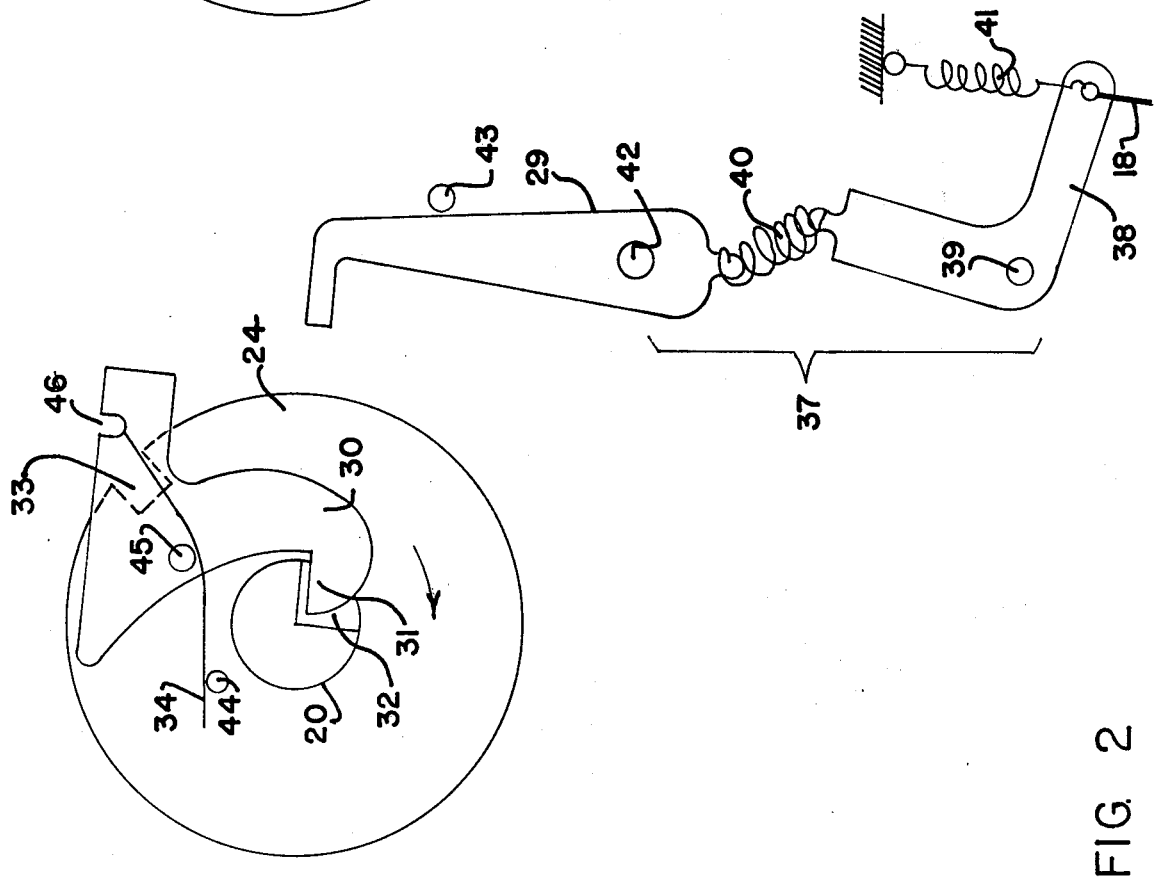
FIG. 2 is a top view of the first clutch (which connects the engine drive shaft to a spool) and associated apparatus, in normal operating condition.

Mounted on the frame 19 of the machine is an interposer 29 which serves to disconnect the dog 30, which couples the spool 21 to the engine shaft 20. Interposer 29 is mounted on pivot 42 which is carried by frame 19 (see FIG. 7). A stop 43 limits the outward motion of interposer 29. The engine shaft is provided with a notch as shown in FIG. 2 so that during the normal operation of the engine 100 (which revolves clockwise as seen in FIG. 2), the tip 31 at the leading end of the dog 30 engages with the notch 32 of the shaft 20. The shaft 20, therefore, drives the spool 21 clockwise, thereby also driving the rotary blade 22.

Figure 4:
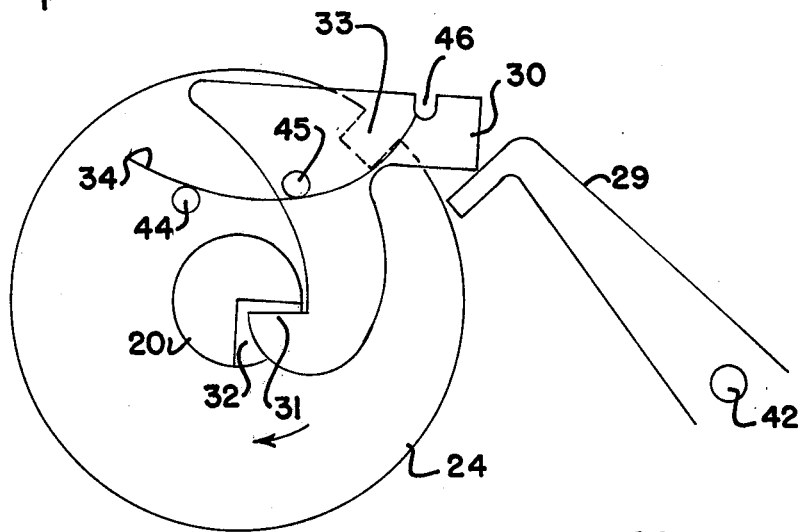
FIG. 4 is a further view of the first clutch a small fraction of a second later than in the case of FIG. 3.
Figure 5:
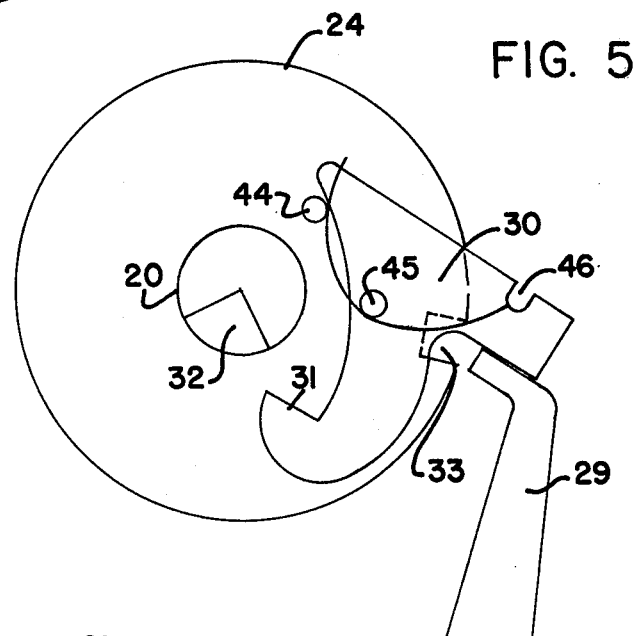
FIG. 5 is a view similar to FIG. 3 except at a still later time comprising a further small fraction of a second.
Figure 6:
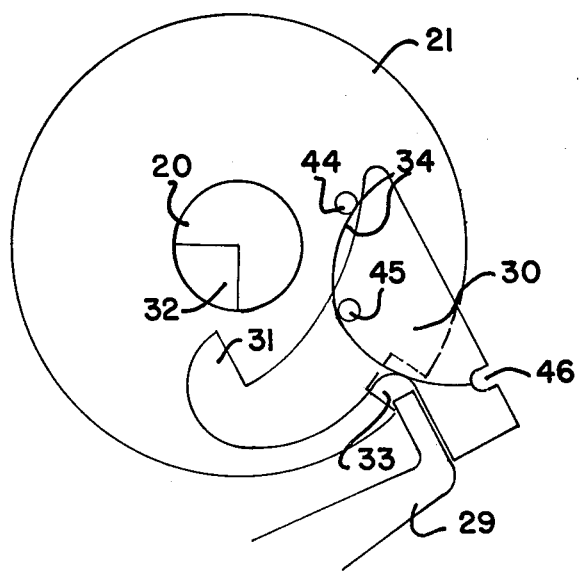
FIG. 6 is a view similar to that of FIG. 3 except at a still later time comprising another small fraction of a second.

When it is desired to stop the blade, the interposer 29 which is mounted on the frame 19 of the machine has to enter into the path of rotation of the dog 30 and remove its front end 31 from the notch 32 of the shaft 20. This position of the interposer is shown in FIGS. 3 to 6. FIG. 4 shows the dog 30 impacting on this interposer 29. The next position (FIG. 5) shows the dog 30 having been swung out of engagement with the shaft 20. The next FIG. 5 shows the spool 21 driven still further by its own inertia and the inertia of the blade 22. The next FIG. 6 shows the interposer 29 entering the notch 33 in the spool 21 so as to prevent its rotation in the reverse direction because of the spring action of the dog 30. In this position, the shaft 20 is free to rotate without driving the blade 22. Although the spool 21 was stopped rather rapidly by the action of the interposer 29, the blade 22 which has a much greater moment of inertia than the spool 21, continues to rotate for a short time but is finally stopped by the friction between it and the spool 21.

When it is desired to re-engage the blade 22 to the engine shaft 20 again, as by action of engaging the dead man's handle 14, the interposer 29 is swung out of the way of the dog 30 as shown in FIG. 2, and the spring 34 which is mounted on the spool 21, drives the dog 30 against the shaft 20 and the shaft picks up the front end 31 of the dog 30 again and starts the spool 21 into rotation very quickly. The spring wire 34 is held in place by pressing against stops 44 and 45 (both mounted on upper spool member 24), and notch 46 in dog 30. Again the inertia of the blade 22 prevents it from following the acceleration of the spool 21 and the friction permits the blade 22 to come up to the shaft speed slower than the spool.

It can thus be seen that the friction between the blade 22 and the spool 21 serves three purposes. It acts as a safety if the blade 22 hits an object such as a stump of a tree in that it permits the engine to rotate with the blade coming to a sudden stop, preventing damage to the engine. The second action is that it acts as a brake on the blade when the spool is stopped by the action of the interposer. Finally, the spool 21 acts as a clutch to start the blade into motion when the spool is again re-engaged with the engine shaft.

FIG. 9 shows a simplified dead man's handle. The cross-arm 17 is the same as is shown in FIG. 1 and the dead man's handle 35 is pivoted at point 36 to the main lawn mower handle so that the operator has to press this handle 35 to operate the machine. When the handle 35 is gripped, swinging it toward the main handle 17, the Bowdin cable 18 is pulled so that it can operate on the mechanism of my invention.

Irrespective whether the dead man's handle is constructed according to FIGS. 1, 8 or 9, the Bowden cable acts on toggle 37 composed of lever 38, pivoted at 39 and connected by spring 40 to interposer 29. The toggle 37 causes abrupt operation of interposer 29 when the dead man's handle 14 (or 35) is moved slowly. When the wire 18 is pulled by spring 41 upon release of the dead man's handle 14 (or 35), member 38 (pivoted at 39) swings the toggle 37 so that the interposer 29 swings into the path of the revolving spool 21. The rest of the action has been explained above.

The method of providing friction between the spool and the shaft is shown in a rather simple form. A Belville washer 26 is used so that it is simply necessary to flatten this washer to obtain the right amount of friction. The friction can be adjusted by the nut 25 threaded onto the spool member 21. Alternatively, various forms of spring collars can be used, depending on the particular choice of the designer.

The various parameters of the design can be changed. For example, the notch in the shaft need not be as deep as shown and other things well known to designers of such devices need not be described here.

After the nut 25 has been tightened against washer 26 to give the desired friction with blade 22, the set-screw 47 may be tightened to hold the elements in place.

Thus, after the dead man's handle 14 (or 35) is released, the spool 21 and associated parts 25, 26, and 47 are abruptly stopped, the blades 22 continue to rotate for a limited time depending on the adjustment of nut 25, and the engine 100 continues to run indefinitely. Upon again gripping the dead man's handle 14 (or 35) to restart the blades 22, the dog 30 immediately engages notch 32 to start spool 21 after which the blade 22 picks up speed at a rate depending on the amount of friction between blade 22, plate 24 and washer 26.

I claim to have invented:

1. In a lawn mower;

first means, including a frame, for moving along the lawn to be mowed, said means including second means which the operator may grip during operation of the lawn mower, motor means supported on said frame and having a shaft directed downwardly toward the lawn to be mowed, rotary blade means carried by said shaft and rotated thereby for cutting grass, a dead man's handle, adjacent said second means, so that the operator may, at the same time, grip both said dead man's handle and said second means during the operation of the lawn mower, coupling means, interposed between said rotary blade means and said shaft, operable (a) when the dead man's handle and said second means are jointly gripped by the operator to connect the rotary blade means to said shaft and (b) when the grip on the dead man's handle is released by the operator to disconnect the rotary blade means and said shaft, said second means comprising a handle by means of which the operator directs the lawn mower in the desired direction, said handle extending rearwardly from said frame and including a cross-member at its free end which cross-member comprises means that enables the operator to push the lawn mower across the lawn to be mowed, said coupling means comprising: (a) a rotatable element rotatable independently of said shaft, (b) connecting means, connecting said dead man's handle to said rotatable element, which (i) connects said element to said shaft so that said element is driven by said shaft when the operator grips both the dead man's handle and said second means, (ii) disconnects said element from said shaft when the operator releases his grip on the dead man's handle, and (iii) suddenly stops the rotatable element when the operator releases his grip on the dead man's handle, and (c) said rotatable element including friction means connecting said blade to said element to rotate the blade said friction means including means to adjust the friction between said element and said blade, said rotatable element comprising a spool having a hole through which said shaft passes, said spool having flanges perpendicular to the axis of said shaft, said blade means having a central opening extending around said spool, said blade means being held by said flanges, said friction means comprising an element between one of said flanges and said blade means, one of said flanges being an upper flange above said blade means and the other flange being below the blade means and constituting the lower flange, said shaft having a notch therein at a level above that of the upper flange of said spool, the improvement comprising:

said connecting means including (i) a pivoted element mounted above the upper side of the upper flange and pivoted upon said upper flange, (ii) a tooth carried by said pivoted element for engaging and disengaging said notch, (iii) biasing means tending to bias said tooth into said notch, and (iv) means operated by the dead man's handle for removing said tooth from said notch when the grip on the dead man's handle is released.

2. In a lawn mower as defined in claim 1:

the last-named means comprising an element carried by the frame which moves into the path of motion of said pivoted means to engage it and rotate said tooth out of said notch when the grip on the dead man's handle is released.

3. In a lawn mower:

first means, including a frame, for moving along the lawn to be mowed, said means including second means which the operator may grip during operation of the lawn mower, motor means supported on said frame and having a shaft directed downwardly toward the lawn to be mowed, rotary blade means carried by said shaft and rotated thereby for cutting grass, a dead man's handle, adjacent said second means, so that the operator may, at the same time, grip both said dead man's handle and said second means during operation of the lawn mower, coupling means, interposed between said rotary blade means and said shaft, operable (a) when the dead man's handle and said second means are jointly gripped by the operator to connect the rotary blade means to said shaft and (b) when the grip on the dead man's handle is released by the operator to disconnect the rotary blade means and said shaft, said second means comprising a handle by means of which the operator directs the lawn mower in the desired direction, said handle extending rearwardly from said frame and including a cross-member at its free end which cross-member comprises means that enables the operator to push the lawn mower across the lawn to be mowed, said coupling means comprising: (a) a rotatable element rotatable independently of said shaft, (b) connecting means, connecting said dead man's handle to said rotatable element, which (i) connects said element to said shaft so that said element is driven by said shaft when the operator grips both the dead man's handle and said second means, (ii) disconnects said element from said shaft when the operator releases his grip on the dead man's handle, and (iii) suddenly stops the rotatable element when the operator releases his grip on the dead man's handle, and (c) said rotatable element including friction means connecting said blade to said element to rotate the blade, said friction means including means to adjust the friction between said element and said blade, said rotatable element comprising a spool having a hole through which said shaft passes, said spool having flanges perpendicular to the axis of said shaft, said blade means having a central opening extending around said spool, said blade means being held by said flanges, said friction means comprising an element between one of said flanges and said blade means, one of said flanges being an upper flange above said blade means and the other flange being below the blade means and constituting the lower flange, said shaft having a notch therein at a level above that of the upper flange of said spool, the improvement wherein:

said connecting means including (i) a pivoted element mounted above the upper side of the upper flange and pivoted upon said upper flange, (ii) a tooth carried by said pivoted element for engaging and disengaging said notch, (iii) biasing means tending to bias said tooth into said notch, and (iv) means operated by the dead man's handle for removing said tooth from said notch when the grip on the dead man's handle is released, the last-named means comprising an element carried by the frame which moves into the path of motion of said pivoted means to engage it and rotate said tooth out of said notch when the grip on the dead man's handle is released, said upper flange having a notch in its periphery and the last-named means including restraining means that enters said last-named notch and stops rotation of said spool when the grip on said dead man's handle is released.

4. In a lawn mower as defined in claim 3:

said connecting means including toggle means which abruptly operates said pivoted means and said restraining means when the release in the grip on the dead man's handle passes a predetermined degree.

5. A lawn mower comprising:

lawn mower means for mowing a lawn including a frame, a motor, carried by said frame, a vertical shaft extending downwardly from said motor, rotary cutting means, and connecting means for connecting said rotary cutting means to said shaft, said connecting means including (a) a rotary element having a hole therein through which said shaft passes, and (b) control means for selectively connecting and disconnecting said rotary cutting means and said shaft, said rotary cutting means being carried by, and driven by, said rotary element, said shaft having a notch therein and said control means including an element mounted upon and pivoted to said rotary element, said element including a tooth, characterized by:

means for biasing said tooth into said notch, said control means including operating means carried by said frame that moves into the path of rotation of said pivoted element and engages the same to move said tooth out of said notch when the control means operates to disconnect the rotary cutting means and the rotary element, in which said rotary element is a disc having a notch in its periphery which is engaged by said operating means a fraction of a revolution of the rotary element after said operating means moves said tooth out of said last-named notch.

6. Coupling means for coupling a driving shaft to a rotary load comprising:

a rotary element surrounding said shaft and rotatable independently of that shaft, said shaft having a notch therein, control means operable to connect said shaft to said rotary element and to disconnect said shaft from said rotary element, comprising (a) an operating element pivoted on said rotary element and having a tooth which enters said notch when the operating element is biased in one direction, said operating element including a projection, (b) biasing means for normally biasing said operating element to cause said tooth to enter said notch in said shaft and cause the rotary element to be driven by the shaft, and (c) means operable (i) to engage said projection to move said tooth out of said notch and thus disengage the rotary element from said shaft, and thereafter (ii) to apply a braking action to said rotary element, said rotary load being driven by said rotary element.

7. Coupling means as defined in claim 6 in which the last-named means includes means to stop said rotary element when it is operated to engage said projection.

8. Coupling means as defined in claim 7 including friction means connecting the rotating load to the rotary element so the rotating load can rotate to a limited extent after the rotary element is stopped.

9. Coupling means as defined in claim 8 in which the moment of inertia of the rotary element is small as compared to that of the rotating load.

10. In a lawn mower having a frame adapted to be moved across the lawn to be mowed, a motor on said frame having a vertical shaft extending downward toward the lawn to be mowed, a rotatable blade on said shaft, connecting means for selectively connecting said blade to and disconnecting said blade from said shaft, and control means for controlling said connecting means;

the improvement wherein:

(a) said connecting means including a rotatable element transverse to said shaft and surrounding said shaft, (b) rotatable means mounted on said rotatable element, (c) means for connecting the rotatable element to said shaft when said rotatable means is rotated in a first angular direction with respect to said rotatable element and for disconnecting said rotatable element from said shaft when said rotatable means is rotated in a second angular direction with respect to said rotatable element, which second angular direction is opposite to said first one, (d) means for moving said rotatable means in said first angular direction with respect to said rotatable element to effect a connection between the shaft and the rotatable element under normal operating conditions, (e) said control means including disconnect and brake means operable in one direction and when so operated in said one direction (i) first rotates said rotatable means in said second angular direction to disconnect the rotatable element from said shaft and (ii) thereafter stops the rotation of said rotatable element, (f) said blade being connected to said rotatable element.

11. In a lawn mower as defined in claim 10:

said rotatable element comprising a spool having a central opening through which said shaft passes and an upper flange upon which said rotatable means is mounted, said spool having a lower flange, said blade having a hole through which said spool passes with said upper flange above the blade and the lower flange below the blade, said blade being rotatable about said spool and having frictional engagement with said flanges, and means for controlling the degree of frictional engagement between said flanges and said blade.

12. In a lawn mower as defined in claim 10:

said control means (i) including a dead-man's handle having a first position under normal operating conditions and which moves to a second position when it is released by the operator and (ii) also including a toggle having an input operated by the dead-man's handle, said toggle having an output, and said disconnect and brake means including means, responsive to the output of said toggle, to effect abrupt movement of the disconnect and brake means in said one direction in response to movement of said dead-man's handle to said second position to thereby disconnect said rotatable element from the shaft and subsequently stop the rotatable element.

13. Coupling means for coupling a driving shaft to a rotary load comprising:

(a) a rotary element coaxial with and rotatable independently of said shaft, (b) an operating element mounted, on said rotary element, for rotary motion with respect to said rotary element, (c) connecting means (i) for connecting said operating element to said shaft to effect rotation of said rotary element with the shaft when said operating element has been rotated, with respect to said rotary element, in a first angular direction and (ii) for disconnecting said rotary element from said shaft when said operating element has been rotated, with respect to said rotary element, in a second angular direction that is opposite to the first one, (d) means for moving said operating element in said first angular direction to normally connect the rotary element to said shaft so that the rotary element rotates with the shaft, (e) said rotary load being driven by said rotary element, the improvement wherein:

control means operable to rotate said operating element in said second angular direction to thereby disengage the rotary element from said shaft and also to subsequently apply braking action to said rotary element.

14. Coupling means as defined in claim 13 in which said rotary load has a high moment of inertia compared to that of the rotary element, and said rotary load and rotary element are frictionally connected so that the rotary load may continue to rotate a limited amount with reference to said rotary element after said braking action takes effect.

* * * * *